United States Patent [19]

Kawaguchi et al.

[11] Patent Number: 4,712,117
[45] Date of Patent: Dec. 8, 1987

[54] ADJUSTING APPARATUS FOR LASER SCANNING SYSTEM WITH ACOUSTO-OPTICAL ELEMENT

[75] Inventors: Fumiaki Kawaguchi, Tokyo; Toshikazu Shimazu; Kazuhisa Takahashi, both of Yokohama, all of Japan

[73] Assignee: Canon Kabushiki Kaisha, Tokyo, Japan

[21] Appl. No.: 792,583

[22] Filed: Oct. 29, 1985

[30] Foreign Application Priority Data

Nov. 15, 1984 [JP] Japan .................. 59-241426

[51] Int. Cl.⁴ .................................. G01D 9/42
[52] U.S. Cl. .................................. 346/108
[58] Field of Search ............ 346/108, 107 R, 76 L

[56] References Cited

U.S. PATENT DOCUMENTS 4,297,713 10/1981 Ichikawa .................. 346/108
4,450,453 5/1984 Kitamura .................. 346/108

Primary Examiner—E. A. Goldberg
Assistant Examiner—Mark Reinhart
Attorney, Agent, or Firm—Fitzpatrick, Cella, Harper & Scinto

[57] ABSTRACT

A laser recording apparatus has a laser light source, an acousto-optical element for optically modulating the laser beam from the laser light source, a beam expander scanning optical system for optically scanning a diffracted light emerging from the acousto-optical element toward a recording surface, an $f\theta$ lens system for imaging the light passed through the scanning optical system on the recording surface, a first plate on which the laser light source and the acousto-optical element are disposed as a first unit, and a second plate on which the beam expander the scanning optical system and the $f\theta$ lens system are disposed as a second unit.

5 Claims, 9 Drawing Figures

ADJUSTING APPARATUS FOR LASER SCANNING SYSTEM WITH ACOUSTO-OPTICAL ELEMENT

BACKGROUND OF THE INVENTION (b 1) Field of the Invention

This invention relates to a laser recording apparatus in which optical adjustment can be made easily.

(b 2) Description of the Prior Art

Generally, in a laser recording apparatus of this type, when recording is to be effected, for example, on a hard copy, as shown in FIG. 1 of the accompanying drawings, a laser beam emitted from a laser light source 1 is deflected by a mirror 2, passes through an optical system 3 for reducing the width of a parallel light beam, is intensity-modulated by an acousto-optical element 4 on the basis of information to be recorded, passes through an optical system 5 for enlarging the width of the parallel light beam and via a mirror 6 to a rotational polygon mirror 7. Then, the laser beam is subjected to main scanning on the rotational polygon mirror 7 and is imaged on a recording surface 9 through an f$\theta$ lens system 8. The mirrors 2 and 6 are for deflecting the laser beam to effectively utilize the space, and all elements including these mirrors are disposed on a base plate 10.

The acousto-optical element 4 is generally disposed as shown in FIGS. 2A and 2B, and when the laser beam Lo (which is parallel to the optical axis of the optical system 3) is caused to enter the acousto-optical element at an angle of incidence $\theta$, the intensity-modulated 1st-order diffracted light $L_1$ (which is parallel to the optical axis of the optical system 5) emerges from the acousto-optical element at an angle of emergence $2\theta$. Accordingly, in an apparatus utilizing the intensity-modulated 1st-order diffracted light $L_1$, it is necessary that the angle formed between the optical axes forward and rearward of the acousto optical element 4 (the optic axis of the optical system 3 and the optical axis of the optical system 5) be $2\theta$. $\theta$ is a slight angle less than 1°, but must be delicately adjusted so that the ratio of the maximum intensity of the 1st-order diffracted light $L_1$ to the maximum intensity of the 0-order diffracted light Lo' is, e.g. 80% or more. The maximum intensity of the 0-order light Lo' is the intensity of the light Lo' when no voltage is applied to the acousto-optical element 4.

Presently, the adjustment of this angle must be effected on the base plate 10 with respect to each element of the optical system subsequent to the acousto-optical element 4, however, this adjustment is very difficult and time-consuming.

There is also a disadvantage in this arrangement in that when the adjustment of the acousto-optic element 4 is again to be effect ed as during the interchange of the laser after the adjustment has been completed, the difficult adjustment must also again be made with respect to each optical element subsequent to the acousto-optical element 4.

SUMMARY OF THE INVENTION

It is an object of the present invention to provide a laser recording apparatus in which the adjustment of an optical system including an acousto-optical element can be made easily.

It is also an object of the present invention to provide a laser recording apparatus in which when the laser has been interchanged, although it is necessary to re-adjust the optical system including the acousto-optical element, the re-adjustment can be made easily.

DESCRIPTION OF THE PREFERRED EMBODIMENTS

Figure 1:
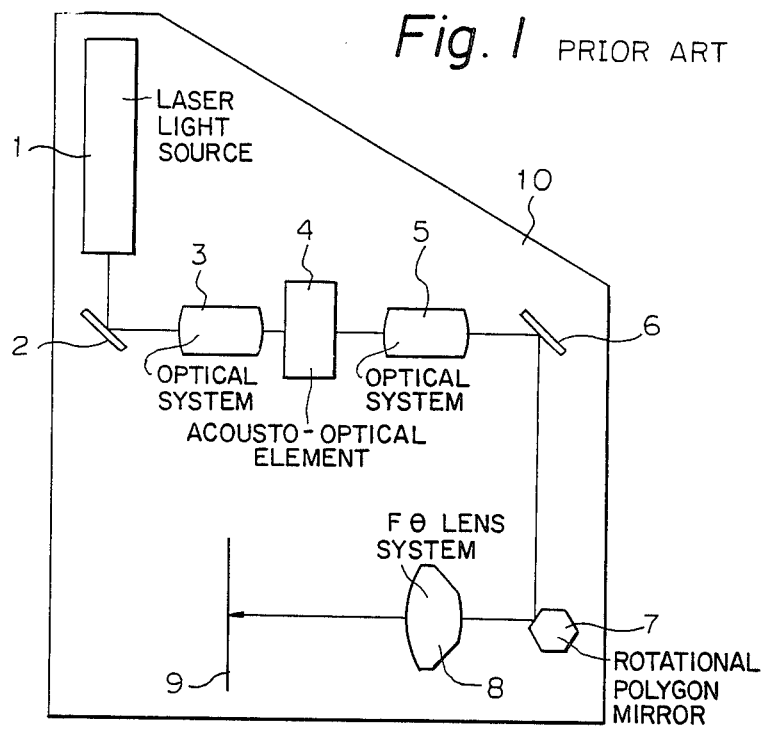
FIG. 1 shows the construction of the laser recording apparatus according to the prior art.

The invention will hereinafter be described in detail with respect to an embodiment thereof shown in the drawings.

Figure 3:
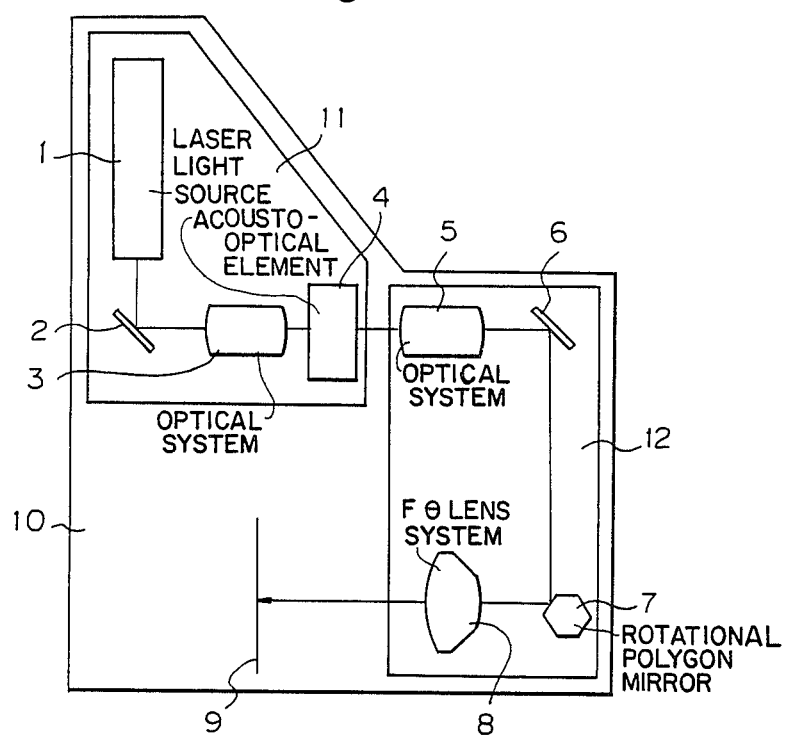
FIG. 3 shows an embodiment of the laser recording apparatus according to the present invention.

FIG. 3 shows an embodiment in which the above-described adjustment can be made easily. In FIG. 3, members similar to those in FIG. 1 are given similar reference numerals. A laser light source 1, a mirror 2, an optical system 3 and an acousto-optical element 4 are placed on a first adjusting plate 11, and an optical system 5, a mirror 6, a rotational polygon mirror 7 and an f$\theta$ lens system 8 are placed on a second adjusting plate 12. The first and second adjusting plates 11 and 12 are constructed so that their positions can be adjusted relative to a base plate 10. In the present embodiment, a recording surface 9 is disposed directly on the base plate 10, but alternatively, it may be disposed on the second adjusting plate 12.

Figure 2A:
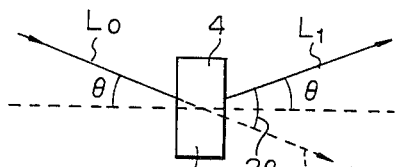
FIGS. 2A and 2B illustrate the diffraction of light by an acousto-optical element.
Figure 2B:
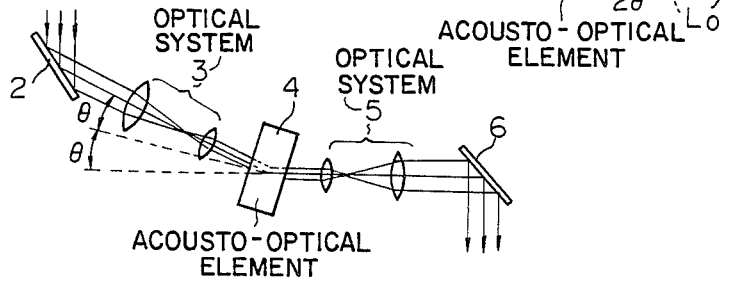

By so unitizing the main optical elements of the laser recording optical system on the first adjusting plate 11 and the second adjusting plate 12, the optical systems of the respective units are independently adjusted, whereafter the first adjusting plate 11 and the second adjusting plate 12 are disposed on the base plate 10. Then, adjustment of the relative disposition of the first adjusting plate 11 and the second adjusting plate 12 on the base plate 10 may be effected so as to be coincident with the direction of diffraction of light by the acousto-optical element 4 as shown in FIGS. 2A and 2B.

Figure 4:
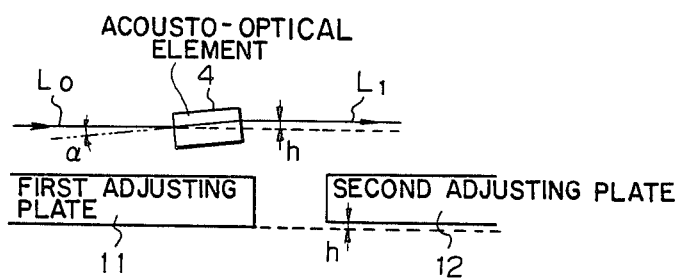
FIG. 4 an illustration for nullifying the reflection of light on the entrance surface and the exit surface of the acousto-optical element.

Generally, the reflection of light on the entrance surface and exit surface of the acousto-optical element 4 is relatively large and therefore, as shown in FIG. 4, the acousto-optical element 4 may preferably be inclined by an arbitrary angle $\alpha$ with respect to the horizontal plane to thereby eliminate ghost. That is, the angle $\theta$ in the horizontal plane is minute and is therefore insufficient to nullify the reflection on the surface of the acousto-optical element and thus, it becomes necessary to set the angle $\alpha$ with respect to the horizontal plane. Therefore, the emergent laser beam $L_1$ has its height varied by h relative to the incident laser beam Lo and hence, it is necessary to vary all of the optical elements subsequent to the acousto-optical element 4 by the height h, but in the present embodiment, this can be realized simply by adjusting the relative height of the first adjusting plate 11 and the second adjusting plate 12.

Further, even when re-adjustment of the acousto-optical element 4 has been made during the interchange of the laser, it is only required to make adjustment of the disposition of the second adjusting plate 12 relative to the first adjusting plate 11 on the base plate 10.

In the unit of the adjusting plate 11, the acousto-optical element 4 is aligned so that the optical axis of the optical system 3 impinges on the central entrance window of the acousto-optical element 4, and is adjusted so that the optic axis of the optical system 3 forms an angle $\theta$ with the normal to the surface of the element in the horizontal plane and forms an angle $\alpha$ with the horizontal plane, and during this adjustment, photodetectors are provided in the direction of emergence of the 1st-order light and the direction of emergence of the 0-order light from the acousto-optical element 4 so that the ratio between the maximum outputs of the two photodetectors is e.g. 80% or more.

Figure 5A:
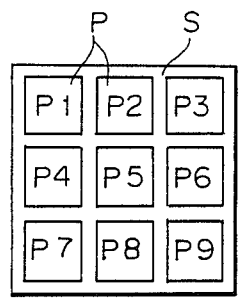
FIGS. 5A, 5B, 5C and 6 illustrate the application of the present invention to a multiformat camera.
Figure 5B:
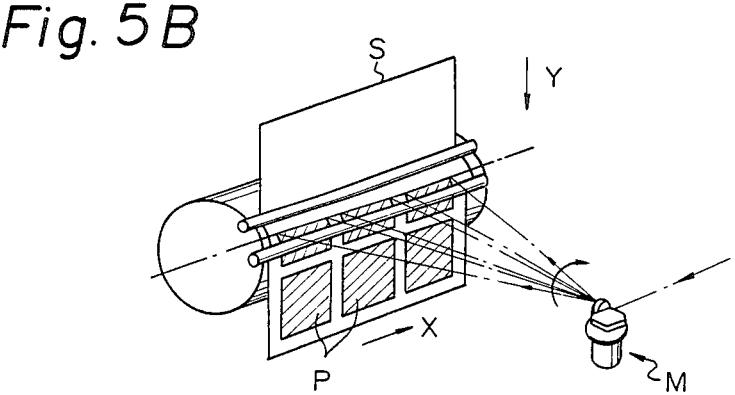
Figure 5C:
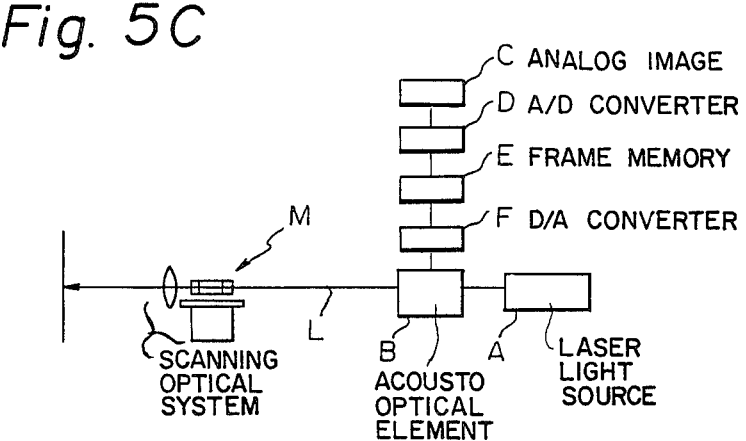
Figure 6:
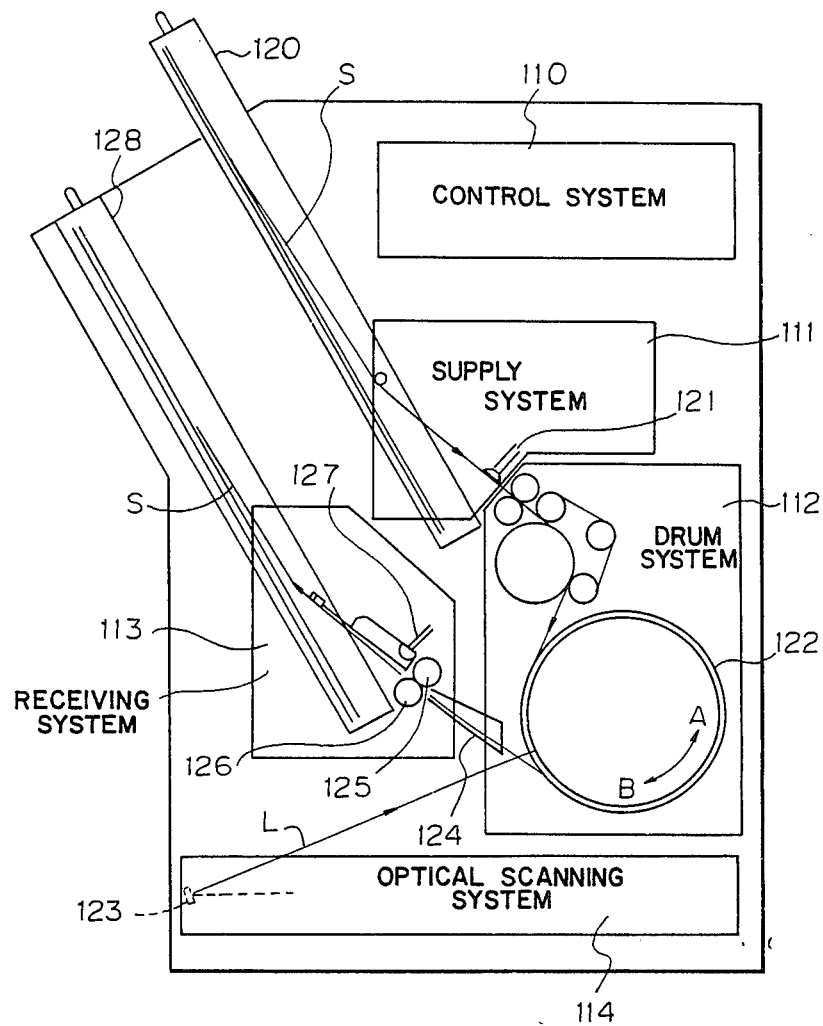

FIG. 6 shows an example in which the present invention is applied to a light beam multiformat camera. The light beam multiformat camera is used, for example, in the field of medical treatment to dividingly record an output image P such as CT (computed tomography), DR (digital radiology), NMR (nuclear magnetic resonance) or ultrasonic wave on a recording sheet (see FIGS. 5A, 5B and 5C).

That is, FIG. 5A shows a plurality of generally different images P1 - P9 recorded on a recording sheet S, FIG. 5B illustrates the scanning effected in the main scanning direction (the X direction) by a scanning optical system M and the scanning effected in the subsidiary scanning direction (the Y direction) by movement of the recording sheet, and FIG. 5C illustrates the modulation of the intensity of the scanning beam. In FIG. 5C, letter A designates a laser light source, letter B denotes an acousto-optical element, letter C designates an analog image, letter D denotes an A/D converter, letter E designates a frame memory, and letter F denotes a D/A converter.

Now, the apparatus shown in FIG. 6 comprises a control system 110, a supply system 111, a drum system 112, a receiving system 113 and an optical scanner system 114 according to the present invention. The control system 110 has a microprocessor and controls the operation of all systems, and the supply system 111 is comprised chiefly of a supply magazine 120 for supplying recording sheets S and a sheet feeding mechanism 121. The drum system 112 comprises chiefly a drum 122 rotatable in directions A and B and effects the supply, the image writing and the discharge of the recording sheets S. The optical scanner system 114 has a laser light source, not shown, a mirror 123, etc., and the receiving system 113 is comprised of a guide plate 124, discharging rollers 125, 126, a sheet pushing-in mechanism 127 and a receiving magazine 128.

The drum 122 is rotated in the direction A during the carrying-in of the recording sheets and rotated in the direction B during the carrying-out of the recording sheets, and the supply magazine 120 and the receiving magazine 128 are provided on the same side with respect to a light scanning plane L, whereby compactness of the apparatus is achieved. During the recording, the drum 122 is rotated in the direction A so that the images P1-P3 in FIG. 5A can be recorded by the first rotation of the drum, the images P4-P6 can be recorded by the second rotation and the images P7-P9 can be recorded by the third rotation, that is, all the images can be recorded by a plurality of rotations. Thus, where the memory capacity of a frame memory for storing the image information is not sufficient for nine frames such as P1-P9 but is only sufficient for three frames such as P1-P3, all the images can be recorded by three rotations of the drum. That is, the utilization of a plulality of drum rotations leads to the possibility of using an inexpensive frame memory of small memory capacity.

What we claim is:

1. A laser recording appartus having:
   a laser light source;
   an acousto-optical element for optically modulating the laser beam from said laser light source;
   a beam expander;
   a scanning optical system for optically scanning a diffracted light emerging from aid acousto-optical element toward a recording surface;
   an f $\theta$ lens system for imaging the light passed through said scanning optical system on the recording surface;
   a frist plate on which said laser light source and said acousto-optical element are disposed as a first unit; and
   a second plate on which said beam expander, said scanning optical system and said f $\theta$ lens system are disposed as a second unit, the relative position of said second plate and said first plate being adjustable.

2. A laser recording apparatus according to claim 1, wherein said acousto-optical element is disposed at a predetermined angle of inclination with respect to said first plate.

3. A laser recording apparatus according to claim 1, further having an optical system for reducing the width of a parallel loght beam provided forwardly of said acousto-optical system.

4. A laser recording apparatus according to claim 1, wherein said first and second units are disposed on a third plate in parallel planes differing in height by a predetermined value h.

5. A laser recording apparatus having:
   a laser light source;
   an acousto-optical element for optically modulating the lase beam from said laser light source;
   a beam expander;
   a scanning optical system for optically scanning a diffracted light emerging from said acousto-optical element toward a recording surface;
   an f $\theta$ lens system for imaging the light passes through said scanning optical system on the recording surface;
   a drum system supporting on the circumference thereof a recording medium for receiving the beam from said f $\theta$ lens system and rotatable in forwad and reverse directions;
   a recording medium supply magazine and a recording medium receiving magazine disposed on one side relative to a scanning plane formed by the beam from said f $\theta$ lens system;
   a first plate on which said laser light source and said acousto-optical element are disposed as a first unit; and
   a second plate on which said beam expander, said scanning optical system and said f $\theta$ lens system are disposed as a second unit, the relative position of said second plate and said first plate being adjustable.

* * * * *

UNITED STATES PATENT AND TRADEMARK OFFICE
CERTIFICATE OF CORRECTION

PATENT NO. : 4,712,117

DATED : December 8, 1987

INVENTOR(S) : FUMIAKI KAWAGUCHI, ET AL.

It is certified that error appears in the above-identified patent and that said Letters Patent is hereby corrected as shown below:

COLUMN 1

Line 7, "(b 1)" should read --1.--.
    Line 10, "(b 2)" should read --2.--.
    Line 38, "acousto optical" should read
        --acousto-optical--.
    Line 38, "optic" should read --optical--.
    Line 40, "2θ.θ" should read --2θ. θ--.
    Line 51, "4, however," should read --4. However,--.
    Line 55, "effect ed" should read --effected,--.

COLUMN 2

Line 11, "FIG.4 an" should read --FIG. 4 is an--.

COLUMN 4

Line 1, "P1-P9" should read --P1-P9, --.
    Line 7, "appartus" should read --apparatus--.
    Line 13, "aid" should read --said--.
    Line 32, "loght" should read --light--.
    Line 46, ""passes" should read --passed--.
    Line 51, "forwad" should read --forward--.

Signed and Sealed this

Twenty-sixth Day of April, 1988

Attest:

DONALD J. QUIGG

Attesting Officer      Commissioner of Patents and Trademarks